United States Patent [19]
Junod et al.

[11] Patent Number: 5,854,621
[45] Date of Patent: Dec. 29, 1998

[54] WIRELESS MOUSE

[75] Inventors: Philippe Junod, Aclens; Berni Joss, Bussigny; Nicolas Sasselli, Lausanne; Rene Sommer, Prilly; Aldo Bussien, Vuillerens, all of Switzerland

[73] Assignee: Logitech, Inc., Fremont, Calif.

[21] Appl. No.: 826,935

[22] Filed: Apr. 7, 1997

Related U.S. Application Data

[63] Continuation of Ser. No. 695,126, Aug. 7, 1996, abandoned, which is a continuation of Ser. No. 250,461, May 27, 1994, abandoned, which is a continuation-in-part of Ser. No. 176,324, Jan. 3, 1994, abandoned, which is a continuation of Ser. No. 672,090, Mar. 19, 1991, abandoned.

[51] Int. Cl.$^6$ ..................................................... G06F 3/033
[52] U.S. Cl. ............................ 345/158; 345/163; 463/39
[58] Field of Search ...................................... 345/156, 157, 345/158, 163–166; 455/6.3, 151.2; 340/825.34, 825.52, 825.53, 825.69, 825.72, 825.24, 825.25, 825.54; 341/20, 176; 463/39

[56] References Cited

U.S. PATENT DOCUMENTS

| | | | |
|---|---|---|---|
| 4,428,078 | 1/1984 | Kuo | 455/6.3 |
| 4,754,268 | 6/1988 | Mori | 345/158 |
| 4,924,216 | 5/1990 | Leung | 345/158 |
| 5,098,110 | 3/1992 | Yang | 345/158 |
| 5,307,297 | 4/1994 | Iguchi et al. | 345/169 |
| 5,339,095 | 8/1994 | Redford | 345/158 |
| 5,349,139 | 9/1994 | Verrier et al. | 345/158 |
| 5,515,051 | 5/1996 | Tanaka et al. | 345/168 |

FOREIGN PATENT DOCUMENTS

| | | |
|---|---|---|
| 0171747A2 | 2/1986 | European Pat. Off. . |
| 4-17495 | 1/1992 | Japan . |

*Primary Examiner*—Jeffery Brier
*Attorney, Agent, or Firm*—Fenwick & West LLP

[57] ABSTRACT

The present invention provides a wireless radio frequency ("RF") communications interface between peripherals and the host personal computer or workstation. In one embodiment, the present invention provides a wireless electronic mouse which uses an RF transmitter to transmit information unidirectionally to a receiver which is coupled to a host computer. This arrangement eliminates the need for a cable connection between the mouse and the receiver, while at the same time permitting continuous communication therebetween. The present invention also provides a method and apparatus to allow the receiver to differentiate between multiple RF wireless mice operating within the same transmission zone by a combination of providing a unique identification code to each transmitting mouse and allowing the user to choose from a plurality of transmission channels. The receiver then automatically switches to the channel selected by the user. The present invention can further receive transmissions from either one or two peripheral devices. In one device mode, the receiver filters out stray frequencies from other RF peripherals. In two device mode, the receiver has the ability to receive information from two RF peripherals, while filtering out other stray RF peripherals operating in the same transmission zone. This allows a user to use the same receiver for one peripheral, such as a mouse, for detailed work and another peripheral for other types of special applications, such as a pointing device for software presentations. The present invention further provides for a power consumption minimization method in the wireless peripheral.

29 Claims, 6 Drawing Sheets

WIRELESS MOUSE

RELATED APPLICATIONS

This is a continuation of application Ser. No. 08/695,126 filed on Aug. 7, 1996, now abandoned, which is a Continuation of Ser. No. 08/250,461 filed May 27, 1994, now abandoned, which is a Continuation-in-Part of U.S. patent Ser. No. 08/176,324 filed on Jan. 3, 1994, which is a Continuation of U.S. patent application Ser. No. 07/672,090 filed Mar. 19, 1991, now abandoned.

FIELD OF THE INVENTION

The present invention relates to communications systems for peripherals for computers and workstations, and more particularly relates to radio frequency, wireless video display cursor pointing devices such as mice or trackballs.

BACKGROUND OF THE INVENTION

Numerous methods for connection of peripherals to personal computers and workstations are known in the art. The most common approach is a cable connection through either an industry standard serial (RS-232) or parallel port. This approach, while workable in most instances, does suffer from some drawbacks with some peripherals.

Specifically, the use of cables with some peripherals, such as electronic mice, impose limitations on the freedom of movement of the user. Even with such limitations, electronic mice have offered significant improvements over other types of data input. Nevertheless, the existence of the cable has, for at least some users, limited the usefulness of existing electronic mice.

Some techniques for providing wireless communication between a computer peripheral and a computer are known. For example, the infamous IBM PCjr used a keyboard which transmitted data signals via an infrared transmitter, with the host having an infrared receiver. This offered some improvement, but eventually was deemed unworkable because the infrared beam became unusable for communications if the transmitter became misaligned with the receiver. An electronic mouse using a similar infrared communications technique has been demonstrated, but was also eventually deemed substantially unworkable, at least in part because the mouse could not readily be kept in alignment with the receiver.

The present invention is a continuation-in-part of U.S. application Ser. No. 08/176,324 which discloses a wireless peripheral device that uses an electromagnetically coupling low frequency transmitter and receiver pair which eliminates the need for a cable connection from the device to the host computer. While this solution permits continuous communication between the peripheral device and the host computer without concern for alignment or obstacles which might impede infrared communications, this solution is also fairly expensive to implement and allows for a limited transmission range (approximately 1.8 meters).

As the range of wireless transmission increases, a continuing problem with the prior art is the simultaneous operation of multiple wireless peripherals which are transmitting to different host computer systems. These peripherals can have conflicting transmission signals, while the peripherals are in transmission range of each other.

There has also been a need in the art to have a wireless receiver which can receive information from more than one peripheral device, such as receiving cursor information from both a wireless mouse and a wireless pointing device used for software presentations.

As a result, there has been a need for a communications device which would permit elimination of the cable connection between the mouse and the receiver, while at the same time permitting an inexpensive, reliable and continuous communication between the mouse and the receiver. There has also been a comparable need for a similar communications interface between the host and other peripherals, such as trackballs, keyboards, digitizing tablets, etc. There has further been a need for a communications interface which can differentiate between multiple wireless devices used on different computers and can also allow more than one wireless device to transmit information to the same computer.

SUMMARY OF THE INVENTION

The present invention substantially overcomes the limitations of the prior art by providing a wireless communications interface between peripherals and host personal computers or workstations. In particular, the present invention provides a wireless electronic mouse, although the interface described herein may be readily adapted to other peripherals.

More specifically, the present invention uses a radio frequency ("RF") transmitter and receiver (or host adapter) pair which eliminates the need for a cable connection between the mouse or other peripheral and the host adapter, while at the same time permitting continuous communication therebetween without concern for alignment or obstacles which might impede infrared communications.

Because conventional RF technology is used to transfer data between the mouse and the host adapter, the resulting product is less expensive and can transmit over longer distances when compared to devices using electromagnetic coupling. In fact, the present invention has the ability to transmit and be received while five meters away from the receiver and in some embodiments can transmit up to ten meters away from the receiver.

The longer transmission range necessitates that the present invention provide a method and an apparatus for allowing a receiver to differentiate between multiple RF wireless mice operating within the same transmission zone. The present invention alleviates this problem by providing a method and apparatus for allowing the user to choose from four different RF transmitting carrier frequencies on the transmitting side. This is accomplished by having the user press a button on the underside of the mouse. The receiver then automatically switches to the channel selected by the user. Further, each transmitter provides identification code information so that the receiver may immediately lock on to a specific transmission.

The present invention also allows a single receiver to receive data from two transmitting peripherals. This allows a user to use, for example, the same receiver for one peripheral, such as a mouse, for detailed work and another peripheral for other types of special applications, such as a pointing device for software presentations.

To reduce power consumption at the mouse (transmitter) side, the mouse enters several power saving modes if it does not receive any activity from the user within specified time limits. Once a user initiated action is taken, the mouse reenters a fully active mode.

A further power consumption reduction at the mouse (transmitter) side includes unidirectional communication between the mouse and the receiver. Because of the unidirectional communication, various other problems must be overcome. Primary among these problems is that the receiver has no way to request a repeat transmission from the mouse, and so must discard data it cannot clearly interpret as correct. Additionally, the receiver cannot inquire concerning the characteristics of the device, for example to determine whether the transmitting device is a mouse, a trackball, a keyboard, or something else; and, if a mouse, whether it has two- or three-buttons. This data can only be ascertained by the receiver if it is sent by the transmitter; however, predetermined default values may be used until such data is sent.

Although a variety of communications protocols and methods for transmission coding may be employed, one method which has been found acceptable is to provide a report frame for communicating data between the mouse and the host, or receiver. The report frame includes a start bits sequence and a stop bits sequence, together with X and Y (horizontal and vertical) displacement data. Preferably, error correction bits will also be provided. Special data codes may be reserved for transmitting other conditions such as switch positions for the mouse or status information. Further, each report frame contains the transmitter identification code information, described above.

Some of the more significant problems relate to recognition of the beginning of a report. A first problem occurs in identifying, at the receiver end, the beginning of a data word. This problem may be overcome by providing a special "start" pattern of a predetermined form—for example, "101". Successful identification of a start pattern is also helpful, and in at least some cases required, in establishing synchronization between the transmitter and the receiver.

It is therefore one object of the present invention to provide a method and means for wireless communications between a host personal computer or workstation and a peripheral which does not require alignment between the peripheral and a host adapter at the host, and is also not sensitive to obstacles in the line of sight path between the peripheral and the host.

It is another object of the present invention to provide a method and a means for wireless communications using RF technology.

It is a further object of the present invention to provide method and means for wireless communication between an electronic mouse and a host personal computer or workstation.

It is a still further object of the present invention to provide a method for selecting a wireless communications channel from a plurality of channels.

It is a still further object of the present invention to provide a method and means for reducing the power consumption at the transmitters side of a wireless communication.

It is a still further object of the present invention to provide a method and a means for receiving signals from more than one transmitting wireless peripheral.

These and other objects of the invention will be better understood from the following Detailed Description of the Inventions, taken together with the attached Figures.

DETAILED DESCRIPTION OF THE INVENTION

This application is a continuation-in-part of U.S. patent application Ser. No. 08/176,324 filed on Jan. 3, 1994 for a Wireless Mouse, incorporated herein by reference.

Figure 1:
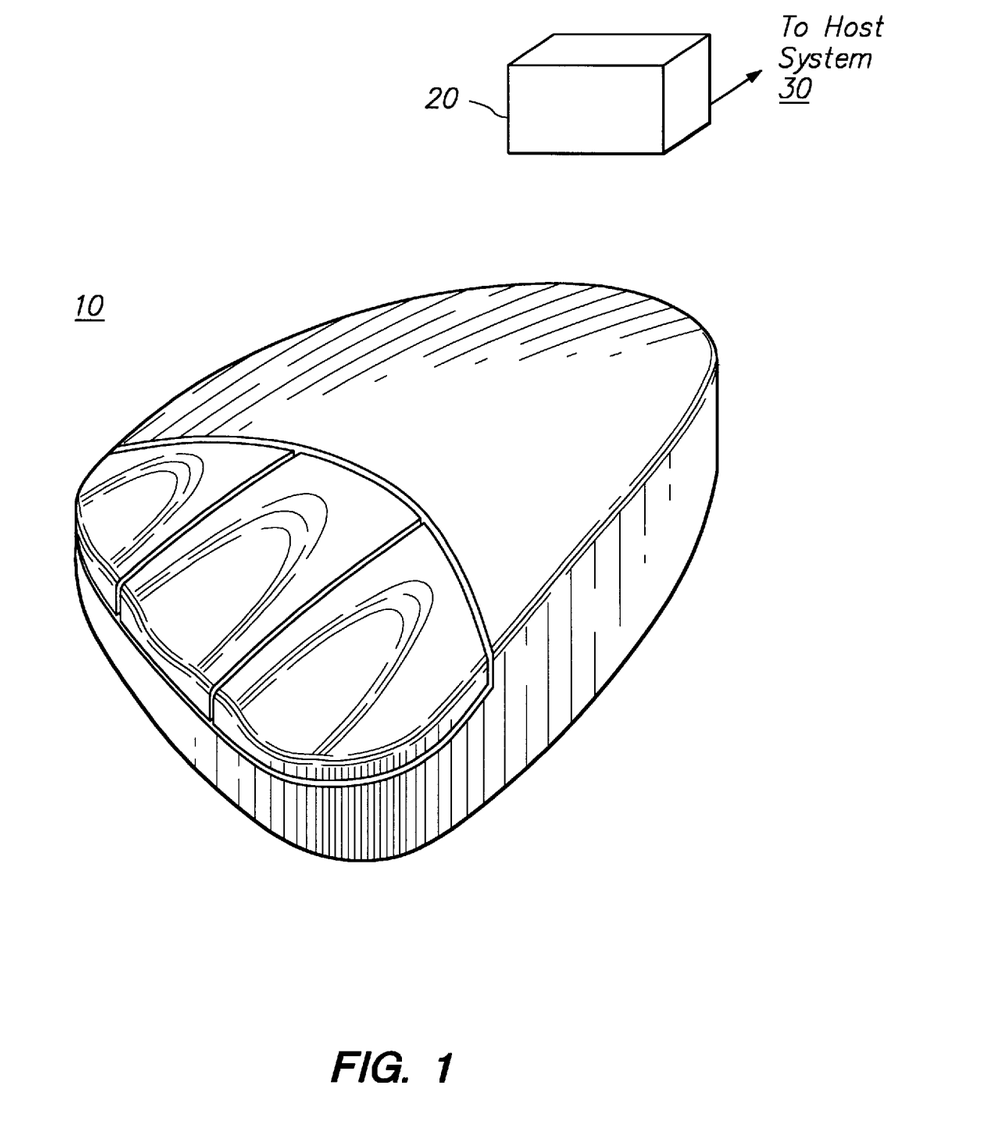
FIG. 1 is a perspective view of a wireless electronic mouse and host adapter according to the present invention.

Referring first to FIG. 1, the wireless operation of the present invention can be better appreciated. A peripheral 10, such as an electronic mouse or other suitable peripheral, communicates with a host adapter 20 by means of radio frequency ("RF") signals. The other suitable peripherals include trackballs, keyboards, digitizing tablets and pointing devices used in software presentations. The mouse 10 communicates with the host adapter 20 on a suitable carrier frequency such as the range of frequencies around 27 MHz, although one skilled in the art will appreciate that many other RF carrier frequencies would be suitable for use with wireless peripherals according to the present invention. The host adapter 20 is connected to a host system 30 (not shown), such as a personal computer or work station, through any suitable protocol. For example, the host adapter 20 may be connected to the host system 30 through a serial port (RS-232) or a mouse port, generally referred to as a PS/2 port.

Figure 2:
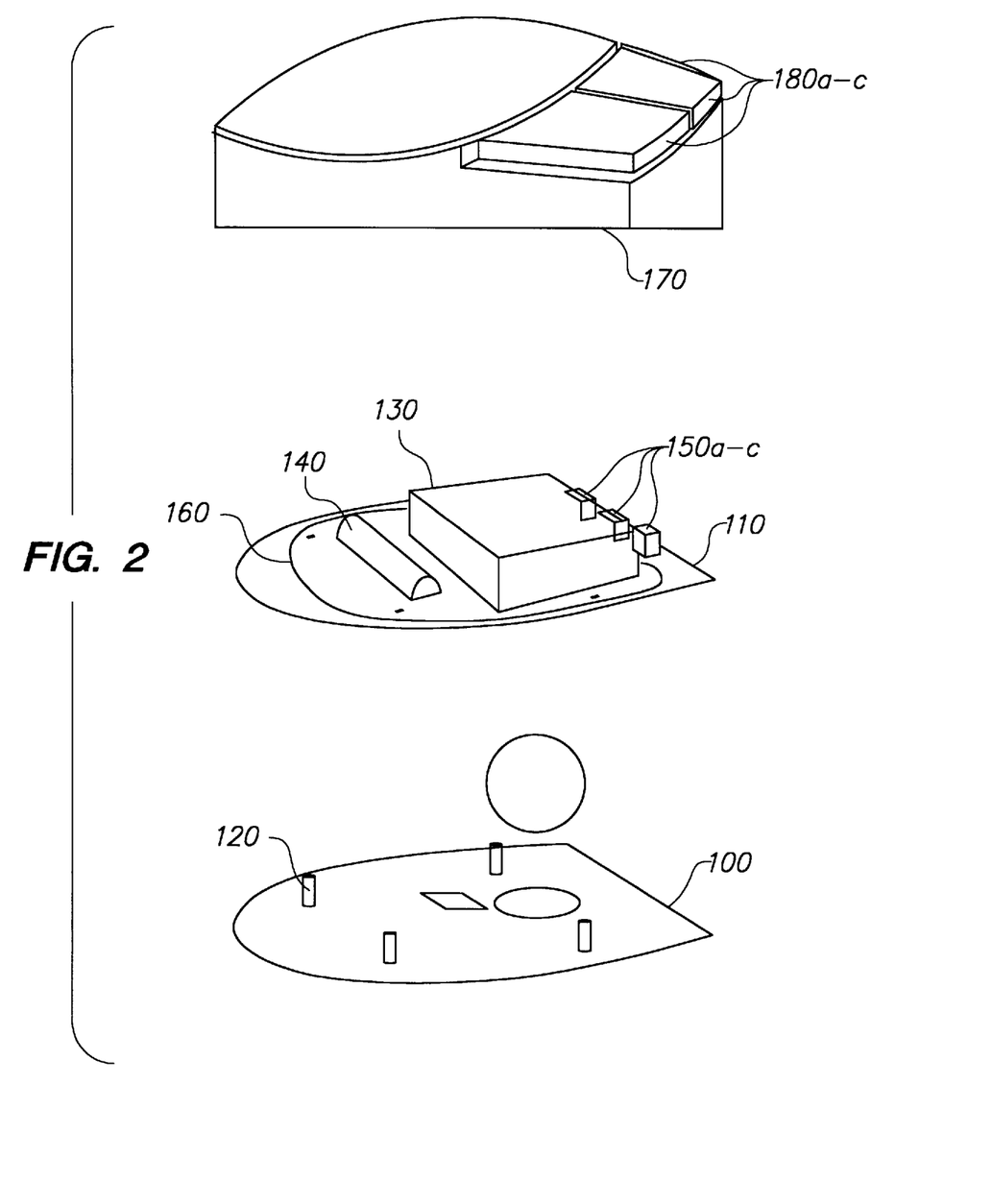
FIG. 2 is a generalized diagram of the major components of the electronic mouse of FIG. 1.

Referring next to FIG. 2, the major components of the wireless mouse 10 of the present invention may be better appreciated. The lower housing 100 serves as a platform, onto which the printed circuit ("PC") board 110 is located by means of locating pins 120. Integral with the lower housing 100 is a ball cage 130, such as is described in U.S. patent application Ser. No. 08/183,897, entitled Integrated Ball Cage for Pointing Device and filed Jan. 21, 1994, incorporated herein by reference. Also integral with the lower housing 100 is a battery holder 140, discussed in greater detail hereinafter. Coupled to the front portion of the PC board 110, are a plurality of switches 150A–C for user actuation in a conventional manner. A loop antenna 160 for transmitting information to the host adapter 20 is printed onto the PC board 110 and is virtually hidden from view. As will be appreciated by one skilled in the art, an antenna of such a low frequency device is generally quite long (such as with a whip antenna); however, the loop antenna here is very small compared to the wavelength of the transmission (approximately 11 meters). A button plate 180, configured to provide a plurality of buttons 180A–C for actuating the switches 150A–C, snaps into an opening in the front of the upper housing 170.

Figure 3:
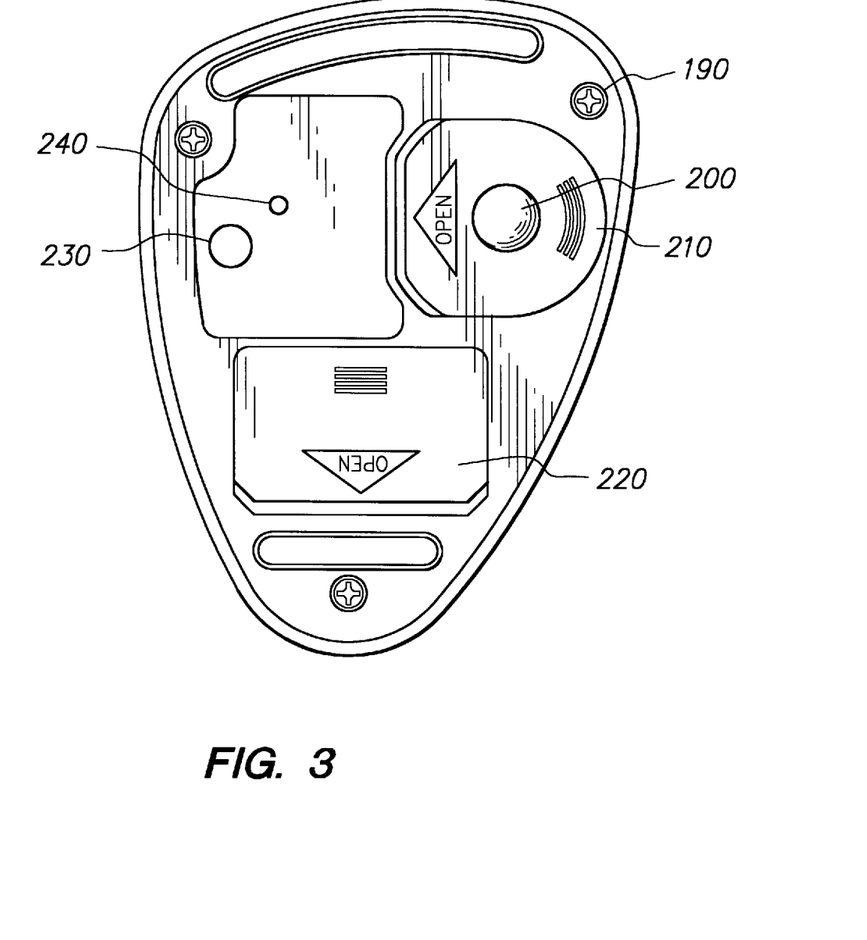
FIG. 3 is a bottom view of the electronic mouse of FIG. 1.

The lower housing 100 may be connected to the upper housing 170 by a plurality of screws 190, as shown in FIG. 3, although other fastening means are acceptable. Positioned within the ball cage is a rubber coated polymeric ball 200 of the sort described in U.S. Pat. No. 4,951,034, although numerous alternative arrangements are equally acceptable. The ball 200 may be inserted into the ball cage 130 through an opening in the lower housing 100. In normal operation, the ball 200 is retained substantially within the ball cage 130 by means of a belly door 210, which fastens into the bottom of the lower housing 100, as shown in FIG. 3. As is conventional, the belly door 210 contains an aperture through which the ball can contact the working surface during normal operation. During operation, the rotation of the ball is converted to digital signals by means of opto-mechanical encoders on the printed circuit board 110 in a conventional manner. Simply put, the opto-mechanical encoders generate a digital quadrature signal representative of the movement of the mouse across the table. Other embodiments may include other techniques for generating displacement information, such as that shown in U.S. Pat. No. 08/199,982, entitled Pointing Device Utilizing A Photo Detector Array and filed Feb. 18, 1994, incorporated herein by reference.

FIG. 3 further shows the battery door 220 which may be fastened to the lower housing 100 to hide the battery holder area 140. A channel selector button 230, in the preferred embodiment, is connected to the PC board 110 and allows a user to switch among four different transmission channels by depressing the button 230. Light emitting diode ("LED") 240 is also connected to PC board 110 and supplies users with channel selection information. The receiver, described in detail hereinafter, will automatically switch to the newly chosen channel through an electronic channel selection means. In operation, if the user presses the channel selector button 230 for a short time (less than one second), the LED 240 blinks the number of times corresponding to the current channel number. If the user presses the channels selector button for a longer period of time (longer than one second), the channel decrements to the next lower channel and the LED 240 blinks the number of times corresponding to the new channel number. Thus, if the transmission channel is channel one and the user changes channels, the next channel will be channel four. In this embodiment, the four user selectable transmitting channels include 26.995 MHz, 27.045 MHz, 27.145 MHz and 27.195 MHz with a bandwidth of 10 KHZ.

Figure 4:
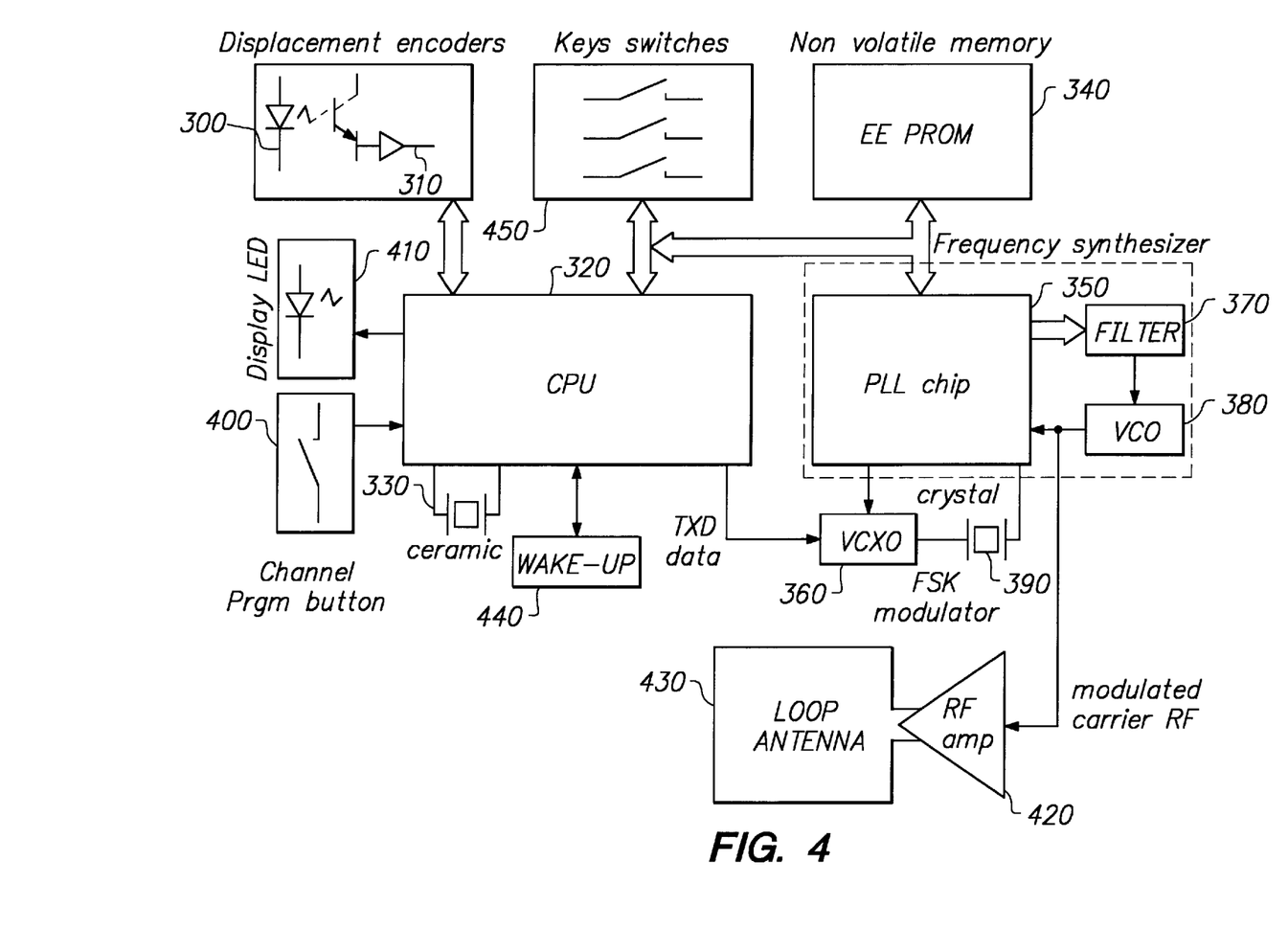
FIG. 4 is a schematic block diagram of the major electronic components of the electronic mouse of FIG. 1.

FIG. 4 shows in schematic block diagram for the operation of the mouse 10. On power up of the mouse (insertion of two AAA batteries), the CPU 320 downloads information from the EEPROM 340. This information includes the frequency of the current radio channel, the sampling rate of the photodetectors 310 and the identification code information for that particular mouse. In an exemplary embodiment, the identification code information could be any of 255 different combinations and allows a host adapter 20 to differentiate between two RF wireless mice operating on the same transmission frequency and in the same transmission zone, so that each mouse 10 (transmitter) has a single identification number that will be accepted by its corresponding host adapter 20 (receiver). Use of the EEPROM 340 aids in development and in future updates for the peripheral and, since EEPROMs are non-volatile memory, the EEPROM 340 provides a means to store the channel and identification code information when powering the mouse down (changing the batteries). New information may replace outdated information on the EEPROM.

The movement of the ball 200 across a work surface causes a pulse train to be sent from photosources 300 to photodetectors 310. The pulses received by the photodetectors 310 are sampled by CPU 320, which may for example be a low power version of a Motorola 68HC05. The CPU 320 samples the photodetectors 310 in accordance with the clock signal provided by a clock generator which, in the preferred embodiment, is internal to the CPU 320. The CPU 320 further monitors and receives user actuated key switch information 450.

The CPU 320 also controls the transmitting radio frequency by controlling the phase lock loop chip ("PLL") 350. The CPU 320 initially receives default information about the transmitting radio frequency channel from the EEPROM 340 at power up and writes this information to the PLL 350. The default value in the EEPROM 340 can be altered by the user by pressing the channel selector button 400. The new channel information will be stored in the EEPROM 340 for the next wake-up (discussed in greater detail hereinafter) or power up of the mouse. The operation of the channel selector button 400 and the LED 410 was described earlier in reference to FIG. 3.

The CPU 320 provides switch and displacement information to the VCXO 360 and the crystal 390 which together act as a frequency shift keying ("FSK") modulator. The frequency is changed by slightly changing the frequency of the crystal 390. The VCXO 360 then interacts with the PLL 350 and the loop filter 370 to create a frequency multiplier which generates the carrier frequency of the transmitting RF signal. The loop filter 370 assures frequency stability. The information to be transmitted is then provided to a voltage controlled oscillator ("VCO") 380 which in turn provides the modulated carrier signal to a loop antenna 430 (discussed earlier) through an RF amplifier 420. The transmitted signals then are picked up by a receiver in the host adapter 20, discussed in greater detail hereinafter. In the preferred embodiment, the FSK modulation is accomplished by switching the PLL's reference frequency oscillator's capacitor, which creates a kind of VCXO. This allows a transmitted data signal spectrum to have DC components which is necessary with the presently used encoding process, described below. The PLL 350 further has a large band width in order to follow the reference frequency changes and to achieve fast locking time when the peripheral is awakened from its sleep mode, described below.

Power for the system is preferably provided by a battery (not shown) which is contained within the battery holder 140. Preferably, an inexpensive power source will be used, such as two AM batteries. If desired, a low voltage detector may be provided to signal low battery conditions to the user.

As long as the battery has sufficient power, the mouse 10 will typically not turn off, but instead can operate in three power modes (normal, standby and sleep) to conserve energy. In normal operation, such as when the mouse is being used, the opto-mechanical encoders (300, 310) will be sampled at full speed, the CPU 320 is clocked at its nominal speed, and displacement and button data is sent continuously to the host adapter 20. However, after a period of nonuse, for example 20 milliseconds, the mouse 10 will enter a standby mode during which the encoders (300, 310) are sampled less frequently, although the CPU continues to work at normal speed. However, to further conserve power in standby mode, the CPU 320 switches off the PLL circuitry (350–390) and the RF amplifier 420. After a further period of nonuse, for example 10 seconds, the mouse 10 enters a sleep mode in which the CPU 320 enter a stop mode and the remainder of the circuitry is in full static condition. Wake up circuitry 440 periodically generates a signal which revives the CPU 320 out of its stop mode to check if any activity has occurred. The sleep timing is calibrated by measuring a first time period and discharging a timing capacitor accordingly. This feature thus allows the use of components with fairly bad tolerances while still achieving fairly precise sleep timing. In the preferred embodiment, the wake up circuitry 440 revives the CPU 320 every 80 milli-seconds. If any activity (i.e. movement of the mouse, depression of a button or depression of the channel program button) does occur in either standby or sleep mode, the CPU 320 returns to normal mode and powers up the rest of the circuitry.

Figure 5:
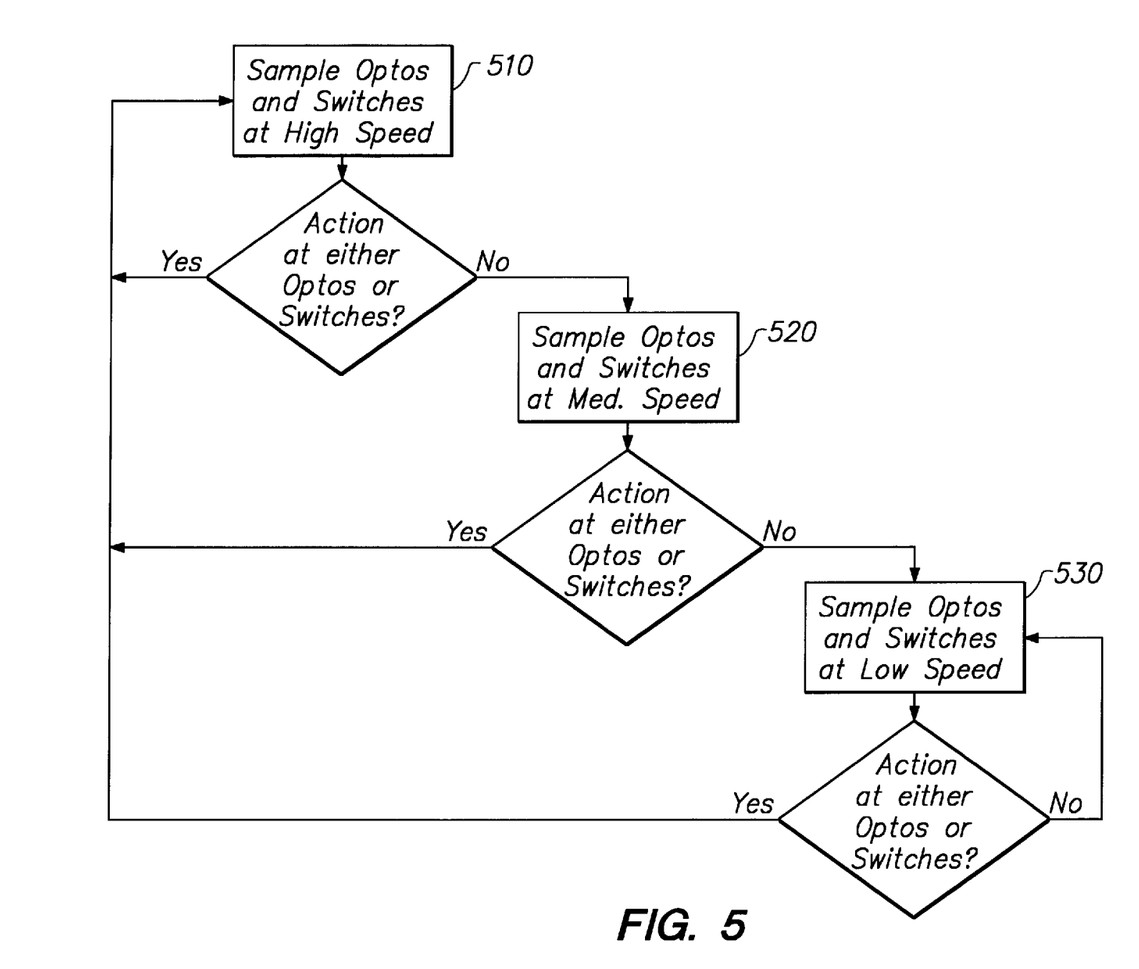
FIG. 5 is a flow chart of the primary elements of the firmware of the present invention.

Shown in FIG. 5 is a simple flow chart describing the transitions from normal mode to standby mode to sleep mode. It will be apparent to those skilled in the art that numerous alternative approaches would also work. However, in the present instance, it can be seen that the opto-mechanical encoders are sampled at high speed (step 510) to determine if the user has taken any action, either by moving the mouse or pressing a button. If a button is pressed, it sends an interrupt to the CPU 320; thus, the CPU 320 need not sample the buttons. If an action has been taken by the user, the mouse remains in normal mode. If no action is detected for a first period, the mouse transitions to a standby mode, and the encoders are again sampled (step 520), but at a medium speed. If the sampling detects action, the mouse is switched to normal mode, at high speed. If no action occurs after a second, predetermined period, the mouse transitions to the sleep mode, operating at low frequency (step 530). In this mode, the mouse's circuitry is in a static condition with the wake-up circuitry 440 periodically reviving the CPU 320 so that it may see if any action has been taken. As before, any movement of either the mouse or the switches causes the mouse to switch to normal mode.

In a presently preferred embodiment, the RF amplifier 420 typically communicates unidirectionally with the host adapter 20, and thus does not receive signals back from the host adapter 20. This unidirectional transmission further aids in reducing power consumption on the transmitting side (mouse). In the preferred embodiment, the data reports are transmitted at 1200 bits per second; although, one skilled in the art will that appreciate other data transfer rates could be used.

Three types of reports can be transmitted from the mouse 10 to the host adapter 20—displacement and switch information reports, status reports, and channel change request reports. Reasonably accurate and rapid reporting of displacement information can be provided by using a multiple bit report frame which includes a start bit sequence, a packet start pattern, transmitter identification code sequence, X and Y displacement data, at least one CRC bit, and a stop bit. In an implementation which has proven successful in testing, the displacement report frame comprises twenty-four bits, of which three bits form a start bit sequence, one bit forms the packet start pattern, four bits form the transmitter identification code sequence, eleven bits provide X and Y displacement data, four bits provide CRC data, and one bit forms a stop bit pattern Set forth below is a graphical representation of one acceptable report frame in accordance with the present invention, although numerous other permutations will provide substantially similar performance:

1 0 1 1 1 0 1 1 1 Y y y y y X x x x CRC CRC CRC CRC 0

Examining the report frame from the left: 101 is the start sequence, 1 is the packet start pattern, 1011 is the transmitter identification code sequence, 1 YyyyyXxxxx provides displacement data where the "1" is used to differentiate displacement reports from status information and other future extended commands, the capital letters X and Y stand for the sign of the displacement and the small x and y stand for the magnitude of the displacement, the CRC codes are used to ensure the accuracy of the unidirectional transmitted signal, and "0" is the stop pattern. Therefore, the displacement portion of the report frame provides eight bits which describe the absolute value of the displacement values in the X and Y directions and two bits describe the sign information (+ or −), one bit for each direction.

If a switch report frame is sent, the displacement data above ("1YyyyyXxxxx") is replaced with the switch data ("110000sssss"), where "110000" identifies a switch report frame and "s" stands for the switch information. If a status report frame is sent the displacement data is replaced with the new status information, either "010aaaaaaaa" or "011ddddddd" depending on whether status addresses are sent or status data is sent, respectively. Typical status information which needs to be transmitted includes mouse identification code information, device type (mouse, trackball, or other) and the number of buttons (one to four, usually two or three); although, it will be appreciated that other information could also be transmitted as status information, such as battery status, firmware and hardware versions, etc. Other status information can also be transmitted depending upon the particular embodiment. If a channel change request report frame is sent the displacement data is replaced with the new channel broadcast information ("1Bcccc10000"), where "B" is the mouse's LED status and "cccc" is the mouse's transmission channel number.

Figure 6:
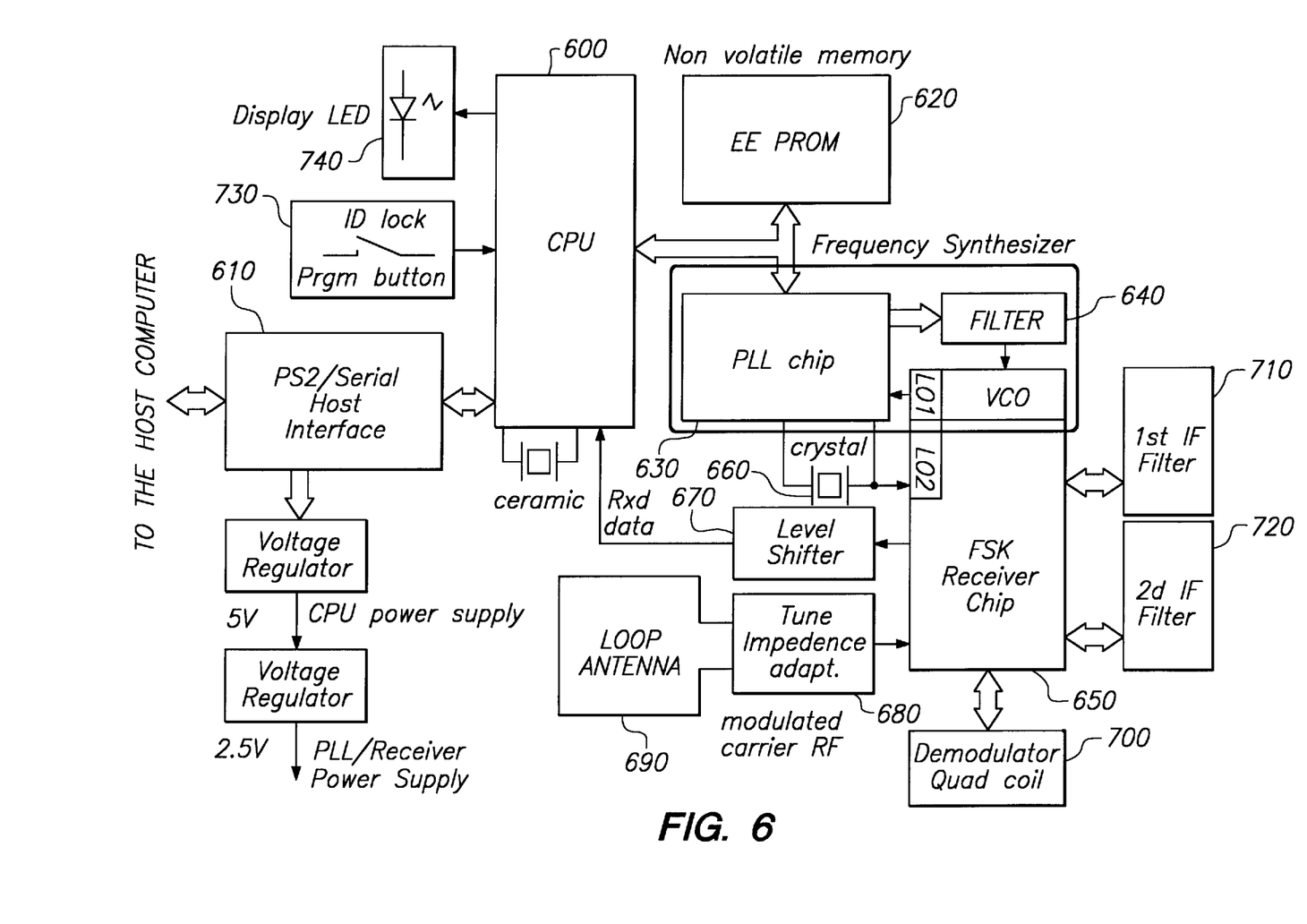
FIG. 6 is a schematic block diagram of the receiver portion of the wireless peripheral interface of the present invention.

Whenever the host adapter 20 receives a valid data report, its CPU 600 causes the LED 740 to blink, as shown in FIG. 6. This blinking provides feedback to the user of the mouse about the validity and usage of the chosen RF mouse channel.

FIG. 6 shows in schematic block diagram for the operation of the host adapter 20. As with the mouse 10, the host adapter's EEPROM 620 provides information to the CPU 600 and the PLL circuitry at power up, such as the correct mouse identification code to look for in the data reports. On power up, the CPU 600 first detects what type of interface 610 it is using to communicate with the host system 30, i.e. serial or PS/2. The CPU 600 then adapts according to which interface is found at 610. In serial mode, the voltage available on the RS-232 lines is regulated to 5 volts, in PS/2 mode this regulation is not necessary. The 5 volts are used to power the CPU 600. A second regulator is used to lower the voltage to 2.5 volts to power the PLL 630 and the FSK receiver chip 650. Next, the CPU 600 programs the PLL 630 with the initial receiver frequency information.

The FSK receiver chip 650 converts the transmitted radio signal to a low frequency signal which can be manipulated by the CPU 600. The FSK receiver chip 650 has two local oscillators LO1 and LO2 and a voltage controlled oscillator (VCO). The second oscillator LO2 is provided by the reference frequency of the PLL 630 from the crystal 660. The first oscillator LO1 varies with the user selected channel number. LO1 is generated with the PLL 630, the filter 640 and the VCO in the FSK receiver chip 650.

After the transmitted signal report is received by the loop antenna 690 at an RF frequency of approximately 27 MHz and passes through the tuning impedance adapter 680, it is provided to the input of an FSK receiver chip 650. The loop antenna 690 here is similar to the loop antenna of the mouse 430, in that it is virtually hidden from sight and is much shorter than the wavelength of the signal it is receiving.

The frequencies in the received signal are subtracted with the frequency of LO1 and then filtered through the first intermediate frequency ("IF") filter 710 to produce a signal which has a frequency of approximately 10.7 MHz. The received signal is then amplified before it is again subtracted with the frequency of LO2. The signal is then filtered by the second IF filter 720 to produce a signal which has a frequency of approximately 455 KHZ. This subtract/filtering process also suppresses unwanted and stray signals which are received by the loop antenna 690, including other peripheral devices which are transmitting on one of the other four RF channels. The FSK receiver chip 650 then demodulates the signal using a demodulator quad coil 700 and equalizes it into a digital format. The process of demodulation is to convert the received signal's frequency variations to magnitude variations which are then able to be detected by the CPU 600 after they pass through the level shifter circuit 670.

The state of switch 730 is read by CPU 600 which will correspondingly change between single and multiple peripheral reception by the host adapter 20. In the single peripheral reception of the presently preferred embodiment, the CPU 600 analyzes the received, demodulated data and discards all of the data reports which do not have the correct mouse identification code attached to them. In this mode, the CPU determines the correct identification code by latching onto the identification code in the first received report and storing it in the EEPROM 620. The CPU 600 can then provide the appropriate signals to the host computer 30, such as a personal computer or workstation, through the PS/2 or serial host interface 610.

In the multiple peripheral reception of the presently preferred embodiment, the primary peripheral device is latched on to as it is in single device mode, described above. The first received identification code, which is not the primary identification code, is latched onto by the CPU 600 as the secondary peripheral device. This identification code is also stored in the EEPROM 620 so that it may be provided to the CPU 600 at a subsequent power up. In two device mode, both peripheral devices must transmit on the same channel frequency and the CPU 600 will not accept user changes in transmission channels. All non-used channels are thus filtered out. In the presently preferred embodiment, when the CPU 600 receives simultaneous reports from both peripheral devices, the weaker of the two RF signals will be suppressed while the stronger of the two signals will be provided to the host computer 30. One skilled in the art will appreciate, however, that many other methods could be used to prioritize and differentiate simultaneous signals received by multiple wireless peripherals and still be contained within the spirit of the present invention.

The purpose for having a two device mode is to allow a user to use two pointing devices with the same host adapter 20. Thus, a user could use two of the same devices (such as for training), both a wireless mouse and a wireless presentation pointing device for software presentations, or a user could use a wireless mouse along with a wireless digitizing pad or trackball. Further, the user can purchase the second wireless peripheral for less money because he will not also have to purchase another host adapter (receiver) unit.

As can be appreciated from the foregoing, the omnidirectional transmission of the signal from the transmitter in the mouse 10 to the host adapter 20 eliminates most concerns about obstacles in the transmission path while at the same time permitting significantly improved freedom for the user by eliminating any mechanical connection from the mouse 10 to the host system 30. In addition, the identification code information and the ability to choose multiple transmission channels upon which to transmit avoids most concerns of radio interference with other devices in the environment. It will be appreciated that the present invention also provides a method and means for receiving signals from more than one wireless peripheral device and that it minimizes power consumption at the transmitting end. It can further be appreciated that this same interface, while described here in detail only in connection with an electronic mouse, can similarly be used with numerous other peripherals.

Having fully described one embodiment of the present invention, it will be apparent to those of ordinary skill in the art that numerous alternatives and equivalents exist which do not depart from the invention set forth above. It is therefore to be understood that the invention is not to be limited by the foregoing description, but only by the appended claims.

What is claimed is:

1. A communication system for receiving signals representing displacement action of a peripheral device comprising:
   a first peripheral device, having
      a first non-volatile memory device for storing a first identifier;
      a first signal generator for generating a first displacement signal based upon a displacement action of said first peripheral device and for generating a first identification signal; and
      a first transmitter, coupled to said first signal generator, for transmitting a first electromagnetic data signal, said first electromagnetic data signal having said first identification signal and said first displacement signal; and
   a receiving unit having:
      a second non-volatile memory device;
      a signal receiver, for receiving said electromagnetic data signal; and
      a processor, disposed to receive said first electromagnetic data signal from said signal receiver, for locking said first peripheral device with said receiving unit when said receiving unit is in a lock-on mode to identify said first identifier as a first of one or more authorized peripherals, and storing a signal representing said first identifier in said second non-volatile memory device, and for processing electromagnetic data signals transmitted only from said authorized peripherals.

2. The system of claim 1, wherein communication between said first peripheral device and said receiving unit is unidirectional.

3. The system of claim 1, wherein said first peripheral device is a computer pointing device.

4. The system of claim 1, wherein said first peripheral device further comprises:
   a first mechanical switching means for selecting one of a plurality of frequency channels at which said first electromagnetic data signal is transmitted.

5. The system of claim 1, wherein said receiving unit further comprises:
   a first switch, for unlocking said first peripheral device from said receiving unit when said first switch is activated.

6. The system of claim 1, further comprising:
   a second peripheral device, having:
      a third non-volatile memory device for storing a second identifier;
      a second signal generator for generating a second displacement signal based upon a displacement action of said second peripheral device and for generating a second identification signal; and
      a second transmitter, coupled to said second signal generator, for transmitting a second electromagnetic data signal having said second identification signal and said second displacement signal; and
   wherein said signal receiver, receives said second electromagnetic data signal; and
   wherein said processor receives said electromagnetic signal from said second signal receiver, stores a signal representing said second identifier in said second non-volatile memory device if said receiving unit is in a lock-on mode, identifies said second identifier as a second of said authorized peripherals, and processes electromagnetic data signals transmitted only from said authorized peripherals.

7. The system of claim 6, wherein said receiving unit further comprises:
a first switch, disposed to transmit signals to said processor, for placing said receiving unit in a lock-on mode to enable the processor to lock on to said second peripheral device.

8. The system of claim 7, wherein said first switch unlocks said first peripheral device from said receiving unit when said first switch is activated.

9. The system of claim 6, wherein said first electromagnetic data signal and said second electromagnetic data signal are transmitted using a single frequency channel.

10. The system of claim 6, wherein said second peripheral device further comprises:
a first mechanical switching means for selecting one of a plurality of frequency channels at which said second electromagnetic data signal is transmitted.

11. The system of claim 1, wherein said first peripheral device includes a printed circuit board having an antenna printed thereon for communicating with said receiving unit.

12. The system of claim 1, wherein said first peripheral device further comprises:
a self-contained power source that supplies all power required for operating said first peripheral;
a sleep module; for determining a first condition when said first peripheral has not been used for a first period and for transmitting a sleep signal to said processor which causes said first peripheral to be in a sleep mode when said first condition is satisfied to reduce power consumption;
a wake-up module for determining when said first peripheral has been used, for transmitting a wake-up signal to the processor which causes said first peripheral to be in a normal operating mode.

13. The system of claim 12, wherein said first peripheral device further comprises:
a standby module, for determining a second condition when said first peripheral has not been used for a second period and for transmitting a standby signal to said processor which causes said first peripheral to be in a standby mode when said second condition is satisfied to reduce power consumption.

14. The system of claim 13, wherein a duration of said first period exceeds a duration of said second period.

15. The system of claim 13, wherein said sleep module measures said first period with a timing capacitor.

16. The system of claim 1, wherein said first peripheral device is one of a mouse, a trackball, and a touchpad.

17. A method for locking a first peripheral device, having a first identifier, to a receiving unit and for receiving signals representing displacement action of the first peripheral device, the method comprising the steps of:
generating a first identification signal by the first peripheral device;
transmitting a first signal representing said first identification signal from said first peripheral device;
receiving said first signal by said receiving unit;
identifying said first identifier as representing said first peripheral, and storing a signal representing said first identifier in a first non-volatile memory device of said receiving unit if said receiving unit is in a lock-on mode to identify said first peripheral as a first of one or more authorized peripherals; and
processing signals transmitted only from said one or more of said authorized peripherals.

18. The method of claim 17, wherein communication between said first peripheral device and said receiving unit is unidirectional.

19. The method of claim 17, wherein said first peripheral device is a computer pointing device.

20. The method of claim 17 further comprising the steps of:
generating a first displacement signal representing a displacement action of the first peripheral device, wherein said first signal includes said displacement signal.

21. The method of claim 17, further comprising the steps of:
generating a second identification signal by a second peripheral device, said second identification signal representing a second identifier for said second peripheral;
transmitting a second signal representing said second identification from said second peripheral device;
receiving said first signal by said receiving unit;
identifying said second identifier as representing said second peripheral, and storing a signal representing said second identifier in said first non-volatile memory device of said receiving unit if said receiving unit is in a lock-on mode to identify said second peripheral as a second of said one or more authorized peripherals; and
processing signals transmitted only from said authorized peripherals.

22. The method of claim 21 further comprising the step of:
unauthorizing said first identifier if said receiving unit is in an un-lock mode.

23. The method of claim 21, wherein said first signal and said second signal are transmitted using the same frequency channel.

24. The method of claim 17, wherein said first peripheral device transmits said first signal using an antenna printed on a printed circuit board in said first peripheral device.

25. The method of claim 17, wherein said first peripheral device includes a self-contained power source that supplies all of the power required for operating said first peripheral, said method further comprising the steps of:
determining a first condition when said first peripheral has not been used for a first period;
transmitting a sleep signal to cause said first peripheral to be in a sleep mode when said first condition is satisfied to reduce power consumption;
determining when said first peripheral has been used; and
transmitting a wake-up signal to the processor which causes said first peripheral to be in a normal operating mode.

26. The method of claim 25, further comprising the steps of:
determining a second condition when said first peripheral has not been used for a second period;
transmitting a standby signal to said processor which causes said first peripheral to be in a standby mode when said second condition is satisfied to reduce power consumption.

27. The method of claim 26, wherein a duration of said first period exceeds a duration of said second period.

28. The method of claim 26, wherein said sleep module measures said first period with a timing capacitor.

29. The method of claim 17, further comprising the step of:

implementing a fast locking phase locked loop in said first peripheral device by pulling the external capacitance of a reference crystal to generate a frequency shift key modulation that permits a bandwidth in a phase locked loop filter that is capable of following the frequency shift key bit modulation.

* * * * *